United States Patent [19]
Walden

[11] 3,842,338
[45] Oct. 15, 1974

[54] EXTENDED OUTPUT POWER CONTROL OF INVERTER

[75] Inventor: John P. Walden, Schenectady, N.Y.

[73] Assignee: General Electric Company, Schenectady, N.Y.

[22] Filed: Apr. 20, 1973

[21] Appl. No.: 352,880

Related U.S. Application Data
[62] Division of Ser. No. 212,295, Dec. 27, 1971.

[52] U.S. Cl. ............ 321/43, 219/10.49, 321/45 ER
[51] Int. Cl. ............................................ H02m 7/52
[58] Field of Search ............ 307/240, 252 J, 252 M; 219/10.49, 10.77; 321/43, 44, 45 R, 45 C, 45 ER

[56] References Cited
UNITED STATES PATENTS

| | | | |
|---|---|---|---|
| 3,263,153 | 7/1966 | Lawn | 321/45 ER |
| 3,321,697 | 5/1967 | Etter | 321/45 C |
| 3,349,314 | 10/1967 | Giannamore | 321/45 C |
| 3,628,047 | 12/1971 | Cronin | 321/45 ER |
| 3,697,716 | 10/1972 | Kornrumpf | 219/10.49 |

*Primary Examiner*—William H. Shoop, Jr.
*Attorney, Agent, or Firm*—Donald R. Campbell; Joseph T. Cohen; Jerome C. Squillaro

[57] ABSTRACT

A single-thyristor series resonant inverter used to drive an induction heating coil is operated at a variable frequency over a limited ultrasonic range in known manner to obtain high output power control. The low output power range is extended by using the secondary winding of a reset transformer and a series connected auxiliary solid state device to limit the amount of recharge energy supplied to the commutating capacitor by the primary winding during non-oscillating intervals of the inverter.

4 Claims, 8 Drawing Figures

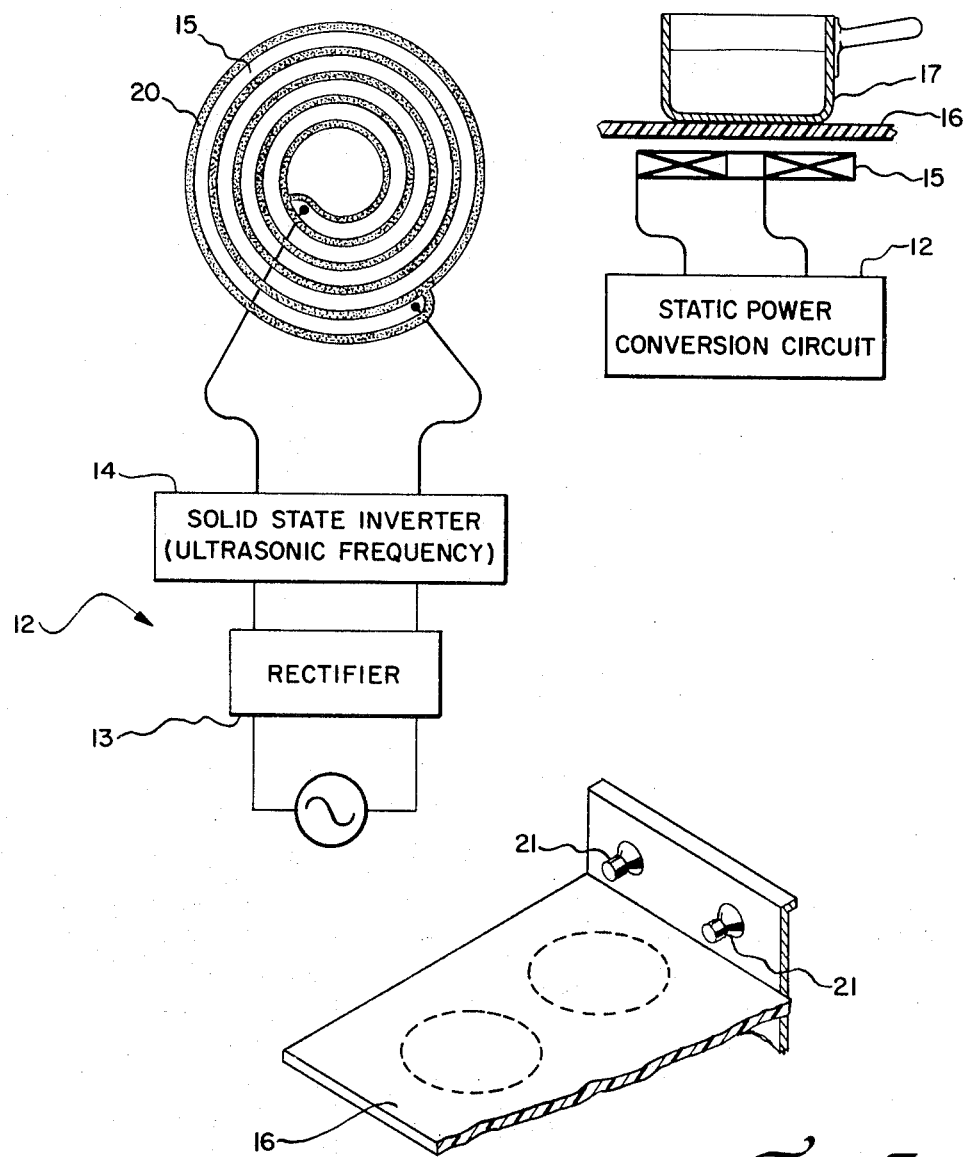

3,842,338

EXTENDED OUTPUT POWER CONTROL OF INVERTER

This is a division of application Ser. No. 212,295, filed Dec. 27, 1971.

BACKGROUND OF THE INVENTION

This invention relates to the wide range output power control of solid state inverters, and more particularly to controlling the output power of ultrasonic frequency induction cooking appliances employing such inverters.

Although known in principle for a number of years, the application of induction heating to the cooking of food was not competitive with the common gas range and electric range based on resistance heating until the development of solid state, ultrasonic frequency induction cooking appliances. These cool top appliances, as they are commonly called, comprise a static power conversion circuit typically formed by a rectifier and an inverter for generating an ultrasonic voltage wave that drives an induction heating coil. The alternating magnetic field generated by the induction coil is coupled across a nonmetallic support with the bottom of the cooking utensil, which acts as a single turn secondary winding.

A low cost, relatively simple inverter suitable for use in ultrasonic cooking equipment is a single-thyristor series resonant inverter utilizing the induction heating coil and a commutating capacitor as the basic LC oscillator circuit. Cooking appliances incorporating an inverter of this type are described in the allowed application Ser. No. 200,424 by John D. Harnden, Jr. and William P. Kornrumpf, file on Nov. 19, 1971 and assigned to the same assignee as this invention now U.S. Pat. No. 3,781,503 dated Dec. 25, 1973. The power output of the inverter must be modulated over a wide range to obtain the range of heating levels and cooking temperatures needed for different cooking requirements. This is achieved by changing the ratio of oscillation time to non-oscillation time, obtained by using a variable operating frequency or by altering the series resonant frequency. Power control is also achieved by changing the magnitude of the oscillation by using a variable input d-c voltage. Wide range power control usually requires a combination of these techniques, since the feasible upper limit of operating frequencies is limited by economic considerations. The present invention is directed to another power control technique for achieving wide range control of the output power without operating at audible frequencies.

SUMMARY OF THE INVENTION

Although useful for applications other than induction cooking and heating, the wide range output power inverter according to the practice of the invention is especially suited for use in solid state induction cooking appliances. The inverter is preferably operated at ultrasonic frequencies and drives an induction heating coil to produce an alternating magnetic field that is coupled across a substantially non-metallic utensil support with the cooking utensil. The preferred embodiment is a single-thyristor series resonant inverter operated at a variable frequency to achieve high output power control by changing the repetition rate of the current pulses supplied to the induction heating coil. The inverter further includes a reset transformer having a primary winding connected to discharge energy during non-oscillating intervals of the circuit, this energy being used to recharge the commutating capacitor. Low output power control circuit means comprising the secondary winding of the reset transformer and an auxiliary solid state device selectively controls the recharge of the commutating capacitor by preferably returning energy to the supply. In one embodiment the auxiliary solid state device is a thyristor that is rendered conductive at different times in the delay interval between current pulses to achieve variable power control. In other embodiments the auxiliary device is a diode, or a diode switched to a selected tap on the secondary winding for stepped control.

BRIEF DESCRIPTION OF THE DRAWINGS

FIG. 1 is a block diagram of a static power converter for supplying ultrasonic frequency power to a flat spiral induction heating coil, shown in plan view, in a solid state induction cooking appliance;

FIG. 2 is a diagrammatic cross-sectional view showing the relation of the induction heating coil to the utensil support and cooking utensil;

FIG. 3 is a fragmentary view of an electric range with an induction cooktop unit having a smooth utensil supporting surface;

DESCRIPTION OF THE PREFERRED EMBODIMENTS

Figure 4:
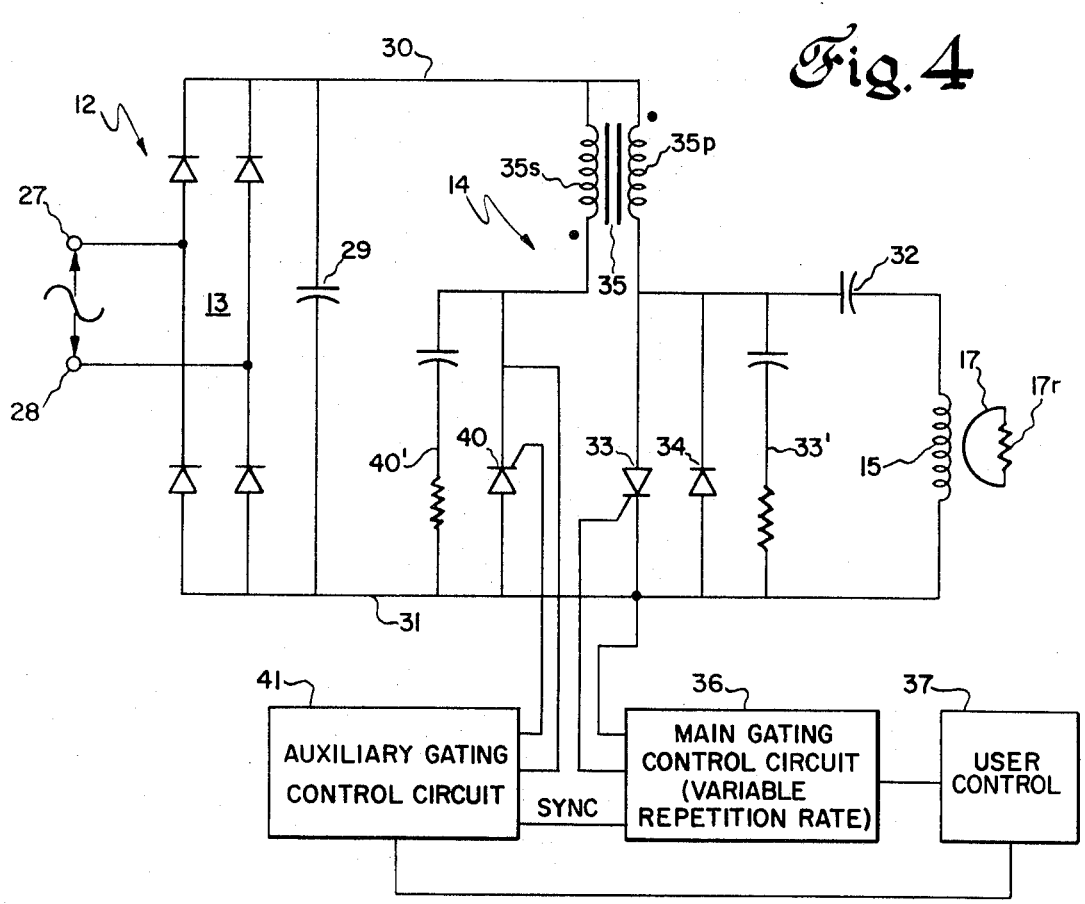
FIG. 4 is a detailed schematic circuit diagram of a static power conversion circuit with a one-thyristor series resonant inverter constructed in accordance with the invention to control the output power over a wide range.

The induction cooking appliance shown in FIGS. 1–3 will be described with regard to an induction surface heating unit in an electric range, but essentially the same mechanical structure and electronic circuitry in higher and lower power versions is suitable for commercial cooking equipment and for a portable countertop food cooking or warming appliance. The static power conversion circuit indicated generally at 12 is energized by a suitable source of alternating current potential such as a single phase commercially available 60 Hz, 120 or 240 volt source, or by a battery source of direct current potential. The static power converter 12 most commonly comprises a rectifier 13 and a solid state inverter 14 for converting the unidirectional rectifier output to an ultrasonic frequency voltage wave that drives the induction heating coil 15. Induction heating coil 15 is a single layer, annular, flat spiral, air-core or ferromagnetic-core coil wound with solid flat strip conductors or braided ribbon conductors. To generate sufficient magnetic flux to heat the utensil to the desired level, coil 15 is tightly wound with the short cross-sectional dimension of the conductors facing upwards and adjacents turns separated by a flat insulating strip 20.

In the cooking appliance (FIG. 2) induction heating coil 15 is appropriately mounted in a horizontal position immediately below a non-metallic or substantially non-metallic support 16 typically made of a thin sheet of glass or plastic. Support plate 16 is commonly referred to as the cooktop surface and supports the metallic cooking utensil 17 to be heated. Cooking utensil 17 is an ordinary cooking pot or pan, a frying pan, or some other available metallic utensil used in food preparation, and can be made of magnetic or non-magnetic materials. Special cooking utensils are not required although the best and most efficient results are obtained by optimizing the size, shape, and material of the utensil. Operation of static power converter 12 to impress an ultrasonic frequency wave on induction heating coil 15 results in the generation of an alternating magnetic field. The magnetic flux is coupled across the air gap through nonmetallic support 16 to utensil 17. At ultrasonic operating frequencies in the range of about 16–40 kHz the cooking appliance is inaudible to most people.

As shown in FIG. 3, an important feature of induction cooking equipment is the relatively smooth and substantially unbroken utensil supporting surface provided by support plate 16. At ultrasonic frequencies there are no reaction forces that would cause utensil 17 to move horizontally when placed on the cooking surface approximately centered with respect to one of the induction surface unit positions indicated in dashed lines. Control knob 21 for each unit on the upstanding back panel of the range turns the individual unit on and off and sets the desired heating level or specific temperature to which the utensil is to be heated. Among the advantages of induction cooking are, briefly, that the surface of support 16 remains relatively cool; spilled foods do not burn and char, and hence both support 16 and utensil 17 are easy to clean; and the unobstructed utensil support is available for other food preparation and cooking tasks. The utensil is heated more uniformly than is the case with the conventional gas range or electric resistance heating range, and the transfer of energy to utensil 17 is relatively efficient since heat is generated only in the utensil where it is wanted. Further, since there is relatively low storage of heat in the cooking utensil, the heating level or temperature to which the utensil is heated can be changed rapidly, as from boiling to simmering to warming levels.

The preferred embodiment of power converter 12 shown in FIG. 4 uses a low cost, variable frequency one-thyristor series resonant inverter 14 in which induction heating coil 15 has the dual function of providing the commutating inductance as well as coupling power to the utensil. The inverter is therefore relatively simple and requires only one gating circuit. Input terminals 27 and 28 are energized by a commercially available 60 Hz, 120 volt single phase source of a-c supply voltage. The d-c power supply formed by full wave diode bridge rectifier 13 and filter capacitor 29 supplies a relatively constant d-c input voltage between inverter input terminals 30 and 31. Inverter 14 comprises a power or main unidirectional conducting thyristor 33 connected in series circuit relationship with the primary winding 35p of a reset transformer 35 between input terminals 30 and 31. A diode 34 to conduct power current in the reverse direction is connected across the load terminals of thyristor 33. A series RC circuit 33' is also usually connected across the load terminals of thyristor 33 for dv/dt protection to limit the rate of reapplication of forward voltage to the device. The basic power circuit is completed by a series connected commutating capacitor 32 and induction heating coil 15 coupled directly across the terminals of the inverse-parallel combination of thyristor 33 and diode 34. When either of these power devices is conducting, capacitor 32 and induction heating coil 15 form a series resonant circuit for generating damped sinusoidal current pulses that flow through induction heating coil 15. The primary winding 35p of reset transformer 35 charges commutating capacitor 32 positively during the non-conducting intervals of the thyristor-diode combination. Each cycle of current flow is initiated by a gating pulse applied to thyristor 33 by a variable repetition rate main gating control circuit 36. Suitable gating control circuits that can be used are described in the previously mentioned Harnden and Kornrumpf application, Ser. No. 200,424 and in another allowed concurrently filed Harnden and Kornrumpf application, Ser. No. 211,926, now U.S. Pat. No. 3,770,928 dated Nov. 6, 1973. A user control 37, as for example, an adjustable potentiometer actuated by control knob 21 on the range back panel (FIG. 3), sets the repetition rate of main gating control circuit 36.

To extend the low output power control range of the inverter, the improvement made by the present invention is that a reset transformer 35, or two-winding reactor, is substituted for the reset inductor, or one-winding reactor, in the known induction cooking inverter (see FIG. 8 of application Ser. No. 200,424. The secondary winding 35s of reset transformer 35 is connected in series circuit relationship with an auxiliary unidirectional conducting thyristor 40 between d-c supply terminals 30 and 31. Auxiliary thyristor 40 is poled in the opposite direction as compared to main power thyristor 33, to conduct current in the direction from negative d-c terminal 31 toward positive terminal 30. The RC snubber circuit 40' connected across the load terminals of auxiliary thyristor 40 is included if needed to damp undesirable high frequency oscillations caused by the rapid discharge of any current left in winding 35s after commutation of auxiliary thyristor 40. As is indicated by the polarity dots, the two windings 35p and 35s of reset transformer 35 are connected in the circuit with opposite polarities. Accordingly, the voltage across secondary winding 35s must exceed the d-c supply voltage in order to condition auxiliary thyristor 40 for conduction by making the cathode potential lower than the anode potential. As will subsequently be explained in greater detail, an auxiliary gating control circuit 41 supplies gating pulses to auxiliary thyristor 40 during the non-conducting intervals of thyristor 33 and diode 34 at a variable time delay after auxiliary thyristor 40 becomes conditioned for conduction. The two gating control circuits 36 and 41 are synchronized such that auxiliary gating pulse circuit 41 will operate at a controlled time delay after operation of main gating control circuit 36. Suitable gating circuits that can be used for auxiliary gating control circuit 41 are described in the SCR Manual, 4th edition, published by the General Electric Company, Semiconductor Products Department, Electronics Park, Syracuse, New York, copyright 1967. The variable timing element in auxiliary gating circuit 41, such as an adjustable resistor, is included in user control 37 and is arranged such that the inverter has a continuously variable power output.

The inverter load is provided by the electrical losses in utensil 17. With respect to the utensil load, induction heating coil 15 functions as the primary winding of an air-core transformer. Utensil 17 functions as a single turn secondary winding with a series resistance 17r representing the resistive part of the $I^2R$ or eddy current losses, and hysteresis losses where applicable. The currents and voltage induced in utensil 17 when the induction surface unit is in operation are determined essentially by the transformer laws. The reflected utensil inductance forms a part of the total inductance of the high frequency resonant circuit of inverter 14.

Control of the output power, and therefore the heating level or temperature of utensil 17, is achieved at the upper end of the desired power range by changing the operating frequency or repetition rate of inverter 14. The low output power control circuit actuated by auxiliary thyristor 40 is inactive at this time since no gating pulses are supplied by auxiliary gating control circuit 41. Primary winding 35p of reset transformer 35 therefore functions as a reset inductor as in the known operation of this inverter circuit. The ultrasonic operating frequencies of interest are between about 16 kHz and about 40 kHz. At the lower end of this range, 16 kHz is considered to be the upper limit or near the upper limit of human hearing for the average person. The other end of the frequency range at 40 kHz is determined largely by economic considerations, in conjunction with the high frequency limitations of available thyristor devices. The series resonant circuit comprising essentially commutating capacitor 32 and induction heating coil 15 is tuned to a resonant frequency that is higher than the highest desired operating frequency. It will be noted that under no-load conditions with utensil 17 removed from the induction surface unit, the total inductance increases and there is therefore a slight change in the resonant frequency of the series resonant circuit. Turning on the induction surface unit applies d-c voltage to inverter 14 and conditions the high frequency resonant circuit for operation by charging commutating capacitor 32 positive as to the plate coupled to positive d-c input terminal 30 and negative as to the plate coupled to d-c terminal 31. The application of a gating pulse to main thyristor 33 by main gating control circuit 36 causes it to turn on, energizing the series resonant circuit essentially comprising commutating capacitor 32 and induction heating coil 15. A damped sinusoidal current pulse flows through induction heating coil 15 and charges commutating capacitor 32 negatively to a value exceeding the supply voltage. At this point the current in the series resonant circuit reverses and a damped sinusoidal current pulse of the opposite polarity flows through induction heating coil 15 and diode 34. Commutating capacitor 32 applies a reverse bias voltage to main thyristor 33, and turn-off is aided by the reverse voltage applied by conducting diode 34. When the current in the series resonant circuit again attempts to reverse, main thyristor 33 does not conduct since it has regained its forward voltage blocking capabilities, and a gating pulse is not applied to the main thyristor at this time. Because of the losses in the electrical circuit due to the heating of utensil 17, commutating capacitor 32 at the end of the complete conduction cycle on a steady state basis is left charged to a lower voltage than it had at the beginning of the oscillation.

Figure 5A:
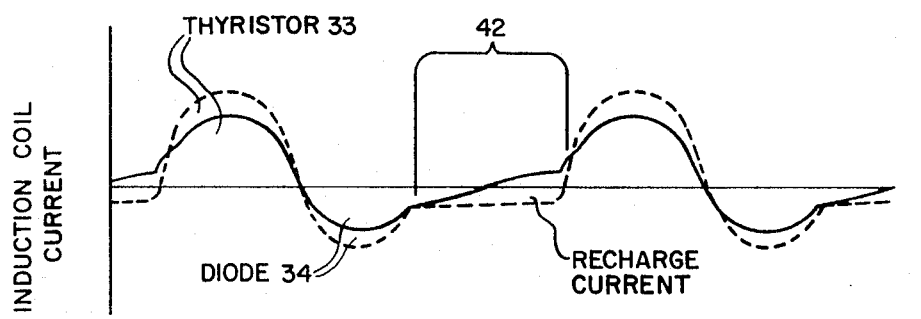
FIGS. 5a and 5b are waveform diagrams of the induction coil current and commutating capacitor voltage for the FIG. 4 inverter under both high output power and low output power conditions.
Figure 5B:
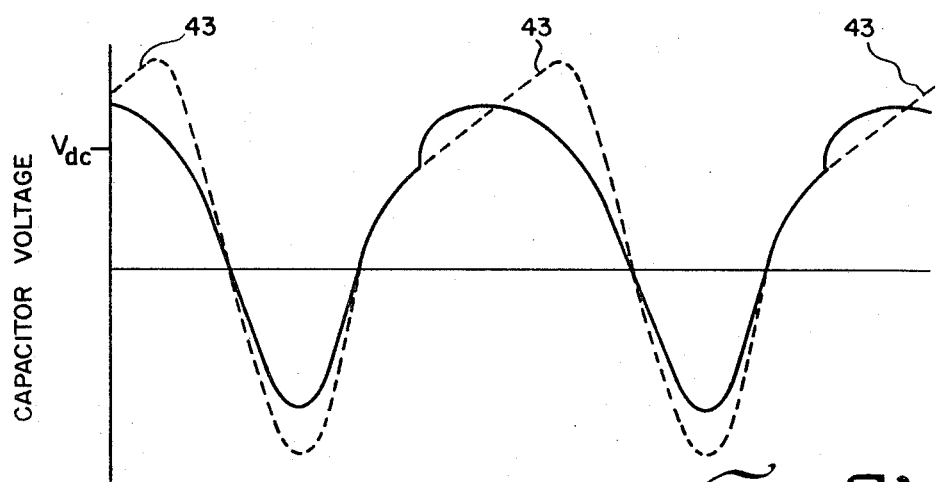

While either main thyristor 33 and diode 34 are conducting, the primary winding 35p of reset transformer 35 is connected between the d-c supply terminals 30 and 31, and accordingly current builds up in winding 35p. During the circuit off-time when both of power devices 33 and 34 are non-conducting, the energy stored in primary winding 35p is discharged and transferred primarily to commutating capacitor 32, thereby leaving commutating capacitor 32 with a net positive charge at the end of the circuit off-time. FIG. 5a shows the sinusoidal induction coil current for two complete cycles of operation separated by a time delay interval 42 corresponding to the circuit off-time or energy transfer period. The dashed line shown is the current under high output power operating conditions. The corresponding commutating capacitor voltage under steady state conditions with the utensil load in place is shown in dashed lines in FIG. 5b. At the end of the conduction cycle the magnitude of the positive voltage on capacitor 32 is lower than the peak negative voltage, and the action of the primary winding 35p of reset transformer 35 during the interval 42 is to change the capacitor voltage almost linearly as indicated at 43, leaving the capacitor with a net positive charge at the end of interval 42. The function of reset winding 35p, then, is to replenish the system energy and sustain circuit oscillation. Te amount of energy transferred to capacitor 32 depends on the magnitude of the current flowing in reset winding 35p at the beginning of the energy transfer period and the time duration of the energy transfer period. The energy transfer period is terminated of course when main thyristor 33 is gated on again causing the high frequency inverter cycle to repeat. With practical component choices the circuit will transfer more energy from reset winding 35p to commutating capacitor 32 as the transfer period is made shorter, relative to the high frequency oscillation period. That is, as the time interval 42 between complete conduction cycles becomes shorter, capacitor 32 is charged to a higher positive voltage during the circuit off-time, so that the magnitude of the capacitor voltage oscillations and of the sinusoidal current pulses increases. In summary, there are two effects that increase the power in watts supplied to utensil 17 when the inverter operating frequency or repetition rate is increased. There are larger and more frequently applied current pulses in induction heating coil 15.

An induction surface heating unit for use in domestic electric ranges desirably has a maximum power output of 1 to 1.5 kilowatts and a minimum power output below 100 watts. The top limit is sufficient for violent and rapid boiling while the low power output is used for warming easily burned foods such as rice. Wide range control of the output power of the inverter of this magnitude cannot be achieved, however, solely by changing the operating frequency within the feasible range of about 16 kHz to 40 kHz. To obtain wide range power control an additional technique for controlling the output power of inverter 14 is required. By way of example, low output power control as herein taught is needed to obtain output power below about 200-400 wats. The use of reset transformer 35 and auxiliary thyristor 40 extends the low output power control range of the inverter and is completely compatible with variable operating frequency control of the output power. The operation of the extended power range inverter is in many respects similar to that of the basic inverter. Assuming that auxiliary thyristor 40 is non-conducting, main thyristor 33 is gated on to initiate one cycle of high frequency oscillation. At the completion of a complete cycle of conduction, recharging of commutating capacitor 32 by the discharge of energy stored in reset winding 35p rapidly causes the capacitor voltage to become more positive than the positive d-c supply voltage. At some time period after this event, depending on the rate of rise of voltage across reset transformer winding 35p and the turns ratio between windings 35p and 35s, the voltage across secondary winding 35s exceeds the d-c supply voltage with the polarity such that the dot end of the winding is negative. When this occurs, auxiliary thyristor 40 is conditioned for conduction since the cathode potential is more negative than the anode potential. The application of a gating signal by auxiliary gating control circuit 41 turns on auxiliary thyristor 40 and clamps secondary reset transformer winding 35s to the d-c supply potential. This results in returning excess energy to the supply, and forces the voltage across primary reset winding 35p to move toward a fixed value equal to the d-c supply voltage times the turns ratio between windings 35p and 35s. The rate at which this equalization of circuit potentials occurs depends to a large extent on the leakage inductance between the two windings, the inductance of the induction heating coil 15, and the capacitance of capacitor 32. The combined inductance of the induction heating coil and the leakage inductance also fundamentally controls the rate of rise of current through auxiliary thyristor 40. Auxiliary thyristor 40 is always in a nonconducting condition at the start of the next conduction cycle since the turn-on of main thyristor 33 causes the potential across reset transformer secondary winding 35s to be positive at the dot end. Accordingly, a limit can be forced on the voltage magnitude to which commutating capacitor 32 is recharged, and consequently the energy stored in the capacitor at the beginning of each inverter cycle and therefore the amplitude of the current pulse and the power output of the inverter. Ordinarily the low output power control circuit is operated with the inverter frequency at its lower limit of 16 kHz or perhaps 20 kHz to allow for harmonic content. At this operating frequency the time delay interval 42 between consecutive conduction cycles is relatively long. By controlling the timing of the gating of auxiliary thyristor 40, the voltage across commutating capacitor 32 at the beginning of each inverter cycle can be varied. Rendering conductive auxiliary thyristor 40 later in the time delay interval 42 causes only a small change in the commutating capacitor potential, while earlier gating causes a larger change. Consequently, the low output power control range of the inverter is extended, and the low output power portion of the complete range is controllable.

By way of example of the operation of the low output power control circuit, FIG. 5a illustrates in full lines the reduced amplitude of the induction heating coil current, assuming that the inverter repetition rate is the same as when generating the dashed line current characteristic. The corresponding full line capacitor voltage likewise has reduced peak values and is drawn for the case in which auxiliary thyristor 40 conducts as early as possible during the energy transfer period. Comparing the full and dashed line capacitor voltages, the net increase in capacitor voltage during the energy transfer period is considerably smaller when the low output power control circuit is in operation. It is believed that the capacitor voltage initially rises at a faster rate at the start of the energy transfer period due to the higher average current level in reset transformer 35. Thereafter the reduction in capacitor voltage as energy is returned to the supply is clearly evident.

Figure 6:
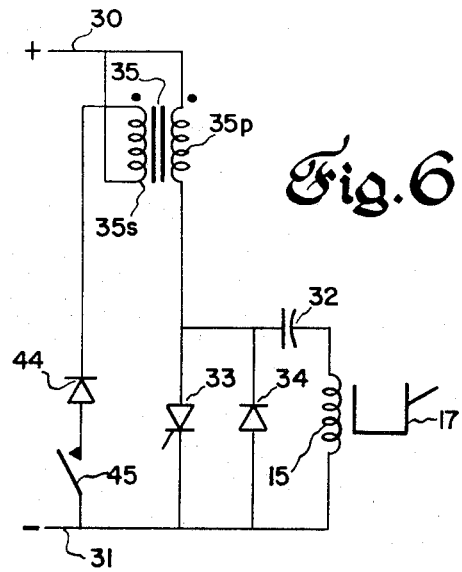
FIG. 6 is a modification of the inverter illustrated in FIG. 4 in which a diode is substituted for the auxiliary thyristor.
Figure 7:
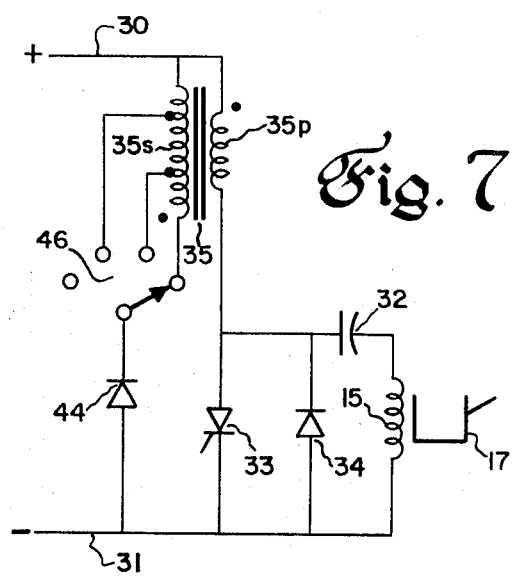
FIG. 7 is a modification of FIG. 6 to obtain stepped control at the lower end of the output power range.

The modification of the invention shown in FIG. 6 is a low cost version usable when the variable control feature is not needed. A diode or uncontrolled rectifier 44 is substituted in place of auxiliary thyristor 40, and a series switch 45 is closed upon adjusting user control 37 or control knob 21 to a low power setting. Diode 44 is forward biased and conducts when the voltage across secondary reset transformer winding 35s exceeds the d-c supply voltage between input d-c terminals 30 and 31. There is thus a single low output power setting below the output power obtained by operating the inverter at the lower limit of its variable operating frequency range. The turns ratio of reset windings 35p and 35s is selected to obtain the desired low power setting. The further modification shown in FIG. 7 uses the diode 44 in conjunction with a tapped secondary reset transformer winding 35s to implement stepped control of the low power portion of the output power range. The use of four-position switch 46 connects the cathode of diode 44 to different points on the secondary winding, with the result that diode 44 conducts at a later point in the time delay interval between conduction cycles as the number of turns is reduced.

The improvement here described to extend the low output power control range of the inverter can also be used with the modifications of inverter 14 shown in FIGS. 5 and 9 of the previously mentioned application Ser. No. 200,424. In FIG. 5 commutating capacitor 32 is connected directly in series with coil 15 and power devices 33 and 34 between the d-c supply terminals, and a single winding reset inductor is connected across the commutating capacitor. FIG. 9 has a similar arrangement with the exception that the single winding reset inductor is connected across both coil 15 and commutating capacitor 32. Although unidirectional conducting thyristors or silicon controlled rectifiers are preferred in the practice of the invention, other power semiconductors such as the triac or diac controlled in unidirectional mode can be used. Further, it is evident that the high frequency series resonant circuit can be operated at a constant operating frequency, and power control obtained solely by the use of reset transformer 35 and auxiliary thyristor 40. An inverter as herein described also has other applications than as a part of induction cooking appliances.

In summary, wide range control of the output power of a single-thyristor series resonant inverter to obtain a wide range of heating levels and cooking temperatures is achieved by a simple circuit addition and without changing the operating characteristics of the basic inverter under high power conditions. The low output power control range is extended by using the secondary winding of the reset transformer and a series connected auxiliary solid state device to selectively return energy to the supply and thereby control the amount of recharge energy transferred to the commutating capacitor during non-oscillating intervals of the inverter. Consequently, the amplitude of the power pulses coupled to the cooking utensil is reduced. As was mentioned, this type of wide power range inverter has utility for applications other than induction cooking and heating.

While the invention has been particularly shown and described with reference to several preferred embodiments thereof, it will be understood by those skilled in the art that various changes in form and details may be made therein without departing from the spirit and scope of the invention.

I claim:

1. A wide range output power inverter connected between a pair of unidirectional voltage input terminals comprising
    a series resonant circuit comprising a commutating capacitor and a pair of alternately conducting main power devices which are operated at a variable frequency within a selected frequency range to generate a train of oscillatory pulses with a variable delay interval therebetween, to thereby achieve high output power control,
    a reset transformer having inductively coupled primary and secondary windings, said primary winding being operatively connected to said series resonant circuit and input terminals to store energy during conducting intervals of said main power devices and discharge energy during the delay intervals between consecutive oscillatory pulses that serves to recharge said commutating capacitor and sustain circuit oscillation, and
    low output power control means for obtaining a plurality of low output power levels while operating within said selected frequency range by controlling the amount of energy discharged by said primary winding and thereby variably recharging said commutating capacitor, said low output power control means comprising a circuit including said reset transformer secondary winding and a series connected auxiliary thyristor device that is selectively rendered conductive at a variable time during said delay intervals.

2. A circuit according to claim 1 wherein said low output power control means is connected between said unidirectional voltage input terminals to return energy to the supply.

3. A wide range output power inverter connected between a pair of unidirectional voltage input terminals comprising
    a series resonant circuit comprising a commutating capacitor and a pair of alternately conducting main power devices which are operated at a variable frequency within a selected frequency range to generate a train of oscillatory pulses with a variable delay interval therebetween, to thereby achieve high output power control,
    a reset transformer having inductively coupled primary and secondary windings, said primary winding being operatively connected to said series resonant circuit and input terminals to store energy during conducting intervals of said main power devices and discharge energy during the delay intervals between consecutive oscillatory pulses that serves to recharge said commutating capacitor and sustain circuit oscillation, and
    low output power control means for obtaining a plurality of low output power levels while operating within said selected frequency range by controlling the amount of energy discharged by said primary winding and thereby variably recharging said commutating capacitor, said low output power control means comprising a circuit including said reset transformer secondary winding, a series connectable auxiliary diode, and a switch for connecting said auxiliary diode to a selected tap on said secondary winding, said secondary winding having a plurality of taps.

4. A circuit according to claim 3 wherein said low output power control means is connected between said unidirectional voltage input terminals to return energy to the supply.

* * * * *